(12) United States Patent
Shin et al.

(10) Patent No.: US 6,714,341 B1
(45) Date of Patent: Mar. 30, 2004

(54) WAVELENGTH CONVERTER AND OPTICAL CROSS-CONNECT SYSTEM USING THE SAME

(75) Inventors: Hong-Seok Shin, Suwon-shi (KR); Seong-Taek Hwang, Pyongtaek-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 20 days.

(21) Appl. No.: 10/441,446

(22) Filed: May 20, 2003

(51) Int. Cl.[7] .............................. G02F 2/02; G02B 6/35; H04J 14/02
(52) U.S. Cl. ........................ 359/326; 385/17; 398/82
(58) Field of Search .................. 398/56, 79, 82–88; 385/16–17, 24; 359/326

(56) References Cited

U.S. PATENT DOCUMENTS 5,724,167 A * 3/1998 Sabella .................. 398/50
5,739,935 A * 4/1998 Sabella .................. 398/50
6,317,529 B1 * 11/2001 Kashima .................. 385/16

* cited by examiner

Primary Examiner—John D. Lee
(74) Attorney, Agent, or Firm—Cha & Reiter

(57) ABSTRACT

This invention provides a wavelength converter and an optical cross-connect system using the same. The inventive system enables one multi-wavelength light source to provide each wavelength converter with the necessary tuned wavelength, without using individual light sources with different wavelengths for each wavelength of a multiplexer. The wavelength converter converts the input multi-channel optical signals into wavelengths used for a subsequent transmission. A wavelength division multiplexer is provided to divide all input optical signals connected to the output link into wavelength units, or collects the divided wavelength-unit optical signals. Meanwhile, a multi-wavelength light source generates a multi-wavelength optical signal, which is applied to and de-multiplexed by the wavelength division multiplexer, and then adapted as a tuned wavelength for wavelength conversion of each channel optical signal.

7 Claims, 2 Drawing Sheets

WAVELENGTH CONVERTER AND OPTICAL CROSS-CONNECT SYSTEM USING THE SAME

CLAIM OF PRIORITY

This application claims priority to an application entitled "WAVELENGTH CONVERTER AND OPTICAL CROSS-CONNECT SYSTEM USING THE SAME," filed in the Korean Intellectual Property Office on Nov. 22, 2002 and assigned Ser. No. 2002-73163, the contents of which are hereby incorporated by reference.

BACKGROUND OF THE INVENTION

1. Field of the Invention

The present invention relates to a wavelength converter and an optical cross-connect system using the same and more particularly to an optical cross-connect system for enabling each wavelength converter to receive a necessary light source from a multi-wavelength light source.

2. Description of the Related Art

Following the current trend of a rapid development of wavelength division multiplexing (WDM) techniques which provides several wavelengths within one optical fiber, it is now possible to transmit a plurality of storage data in large quantity using a single optical fiber in a very high-speed optical communication field. In the near future, it is anticipated that current linear or circular networks utilized for transmitting data via a fixed path of an optical communication network will be changed to "All Optical Transmission Networks" (AOTNs), which provides a means for dynamically reconstructing its own network configurations by diverting an optical path when necessary. Particularly, it is anticipated that a backbone network will be replaced with a mesh-type network based on Optical Cross-Connector (OXC) to provide reconstructions of circuit lines at each node.

Note that the optical cross-connector (OXC) can be implemented with an electric method or an optical method. The electric method converts an input optical signal into an electric signal using optic-to-electric conversion and performs a switching operation, then reconverts the electric signal back into an optical signal. In contrast, the optical method de-multiplexes a wavelength-multiplexed optical signal received from an input link and switches the signal in wavelength units using a space switch. This type of an optical method is further classified into several sub-methods according to a wavelength converter (WC). For example, one such sub-method is a wavelength interchanging cross-connector, known for ensuring the extensiveness of a routing algorithm as well as lowering the probability of a channel blocking by a wavelength converter.

FIG. 1 is a view illustrating a block diagram of a conventional wavelength interchanging cross-connector. As shown, the conventional cross-connector includes a wavelength division demultiplexer 10, an optical space switch 20, a plurality of wavelength converters 30~33, a wavelength division multiplexer 40, and a plurality of wavelength light sources 50~53. In FIG. 1, a reference character ADD denotes the added signal channel, and the other reference character DROP denotes the dropped signal channels.

In operation, an incoming optical signal received via an input optical fiber is wavelength demultiplexed by the wavelength-division-demultiplexer 10, then cross-connected by the optical space switch 20. The cross-connected optical signal is wavelength-converted by the wavelength converters 30~33, then applied to and multiplexed by the wavelength-division-multiplexer 40, thus generating a multiplexed optical signal on an output optical fiber. The optical cross-connector has a plurality of input links such that the number of optical signal channels having the same wavelengths is the same as the number of links. However, if at least two each wavelengths are routed to one common output link, a line contention occurs. To solve this problem, if a wavelength conversion towards an unused wavelength is provided at a link to be outputted, the network availability increases. Therefore, a wavelength converter is mounted to each channel of the wavelength division multiplexer 40 to increase the network availability.

However, the aforementioned conventional wavelength interchanging cross-connector enables each of the wavelength converters 30~33 to receive a light source corresponding to a wavelength of the wavelength division multiplexer 40 using a plurality of individual light sources 50~53. Therefore, the system further requires a light source stabilizer. Moreover, as the conventional wavelength interchanging cross-connector mounts a number of light sources for different wavelengths, the system requires a number of wavelength converter models.

Accordingly, there is a need to provide an improved cross-connect system so that additional components required to achieve the conversion of wavelengths can be minimized.

SUMMARY OF THE INVENTION

One aspect of the present invention is to provide a wavelength converter and an optical cross-connect system using the same for enabling one multi-wavelength light source to provide each wavelength converter with the necessary tuned wavelength, without using individual light sources with different wavelengths for each wavelength of a multiplexer as in the prior art system.

Another aspect of the present invention is to provide a wavelength converter using a multi-wavelength light source which includes: a wavelength division multiplexer for dividing input optical signals into wavelength units or collecting the divided wavelength-unit optical signals; a wavelength converter for performing a wavelength conversion on an input multi-channel optical signal; a multi-wavelength light source for generating a multi-wavelength optical signal needed to perform the wavelength conversion of the wavelength converter; a first optical circulator for transmitting the multi-wavelength optical signal to the wavelength division multiplexer and for outputting a transmission optical signal generated from the wavelength division multiplexer to an output link; and, a second optical circulator for providing a single-wavelength light source demultiplexed by the wavelength division multiplexer as a tuned wavelength needed to perform the wavelength conversion of the wavelength converter and for outputting a wavelength-converted transmission optical signal generated from the wavelength converter to the wavelength division multiplexer.

Yet another aspect is to provide a wavelength interchanging cross-connector, which includes: first and second wavelength division multiplexers for dividing input optical signals for all directions into wavelength units, or collecting the divided wavelength-unit optical signals; a space switch for switching input signals with different wavelengths via the first wavelength division multiplexer; a wavelength converter for performing a wavelength conversion on the switched signals to be converted into signals corresponding to each wavelength of the second wavelength division multiplexer; a multi-wavelength light source for generating a multi-wavelength optical signal needed to perform the wavelength conversion of the wavelength converter; a first optical circulator for transmitting the multi-wavelength optical signal to the second wavelength division multiplexer and for outputting a transmission optical signal generated from the second wavelength division multiplexer to an output link; and, a second optical circulator for providing the multi-wavelength optical signal demultiplexed by the second wavelength division multiplexer as a tuned wavelength needed to perform the wavelength conversion of the wavelength converter and for outputting a wavelength-converted transmission optical signal generated from the wavelength converter to the wavelength division multiplexer.

Yet another aspect is that the present invention may be realized in a simple, reliable, and inexpensive implementation.

BRIEF DESCRIPTION OF THE DRAWINGS

The above features and other advantages of the present invention will be more clearly understood from the following detailed dascription taken in conjunction with the accompanying drawings, in which.

DETAILED DESCRIPTION OF THE PREFERRED EMBODIMENTS

Figure 1:
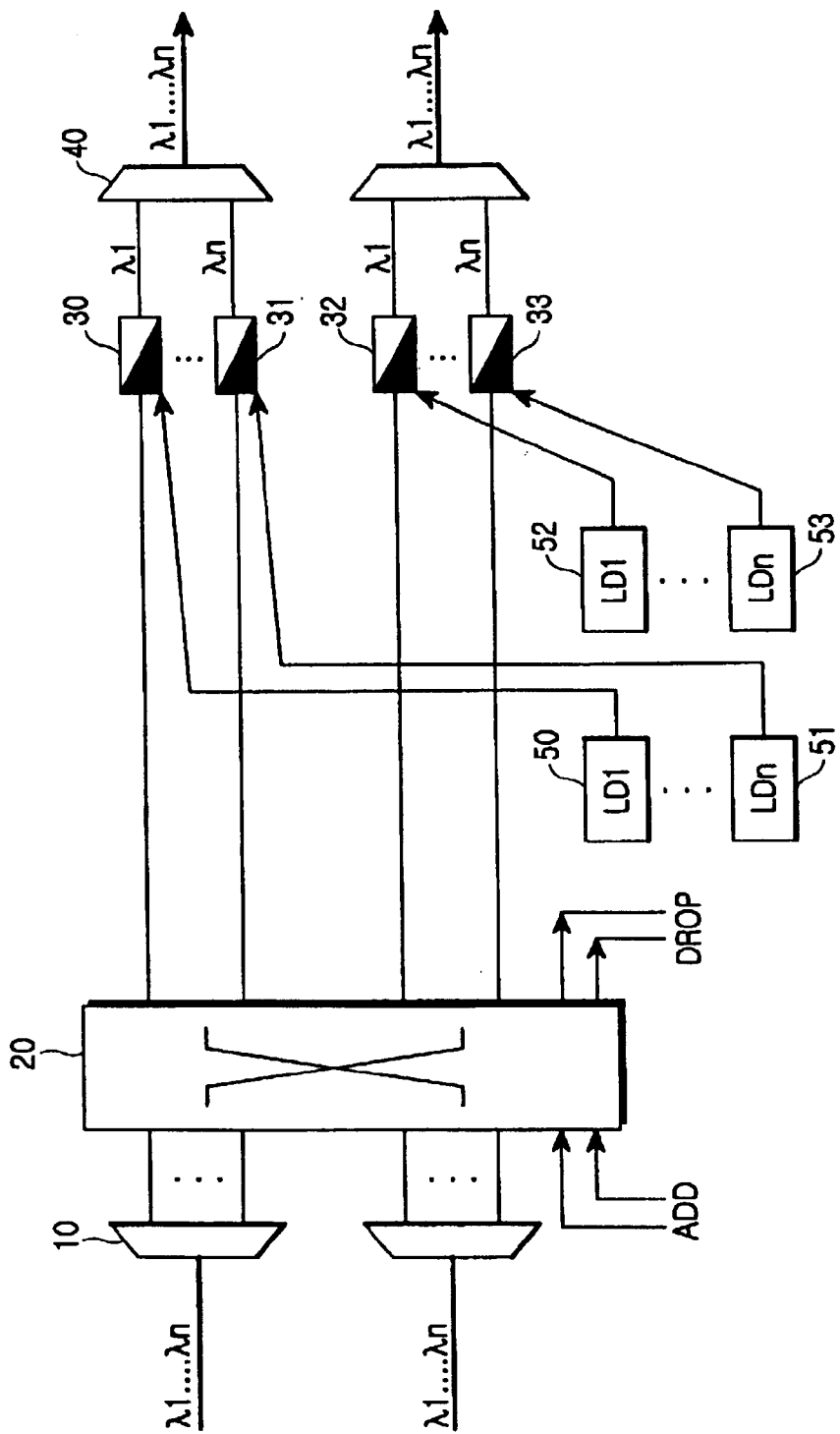
FIG. 1 is a view illustrating a block diagram of a conventional wavelength interchanging cross-connector; and, FIG. 2 is a view illustrating a block diagram of a wavelength interchanging cross-connector in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention unclear.

Figure 2:
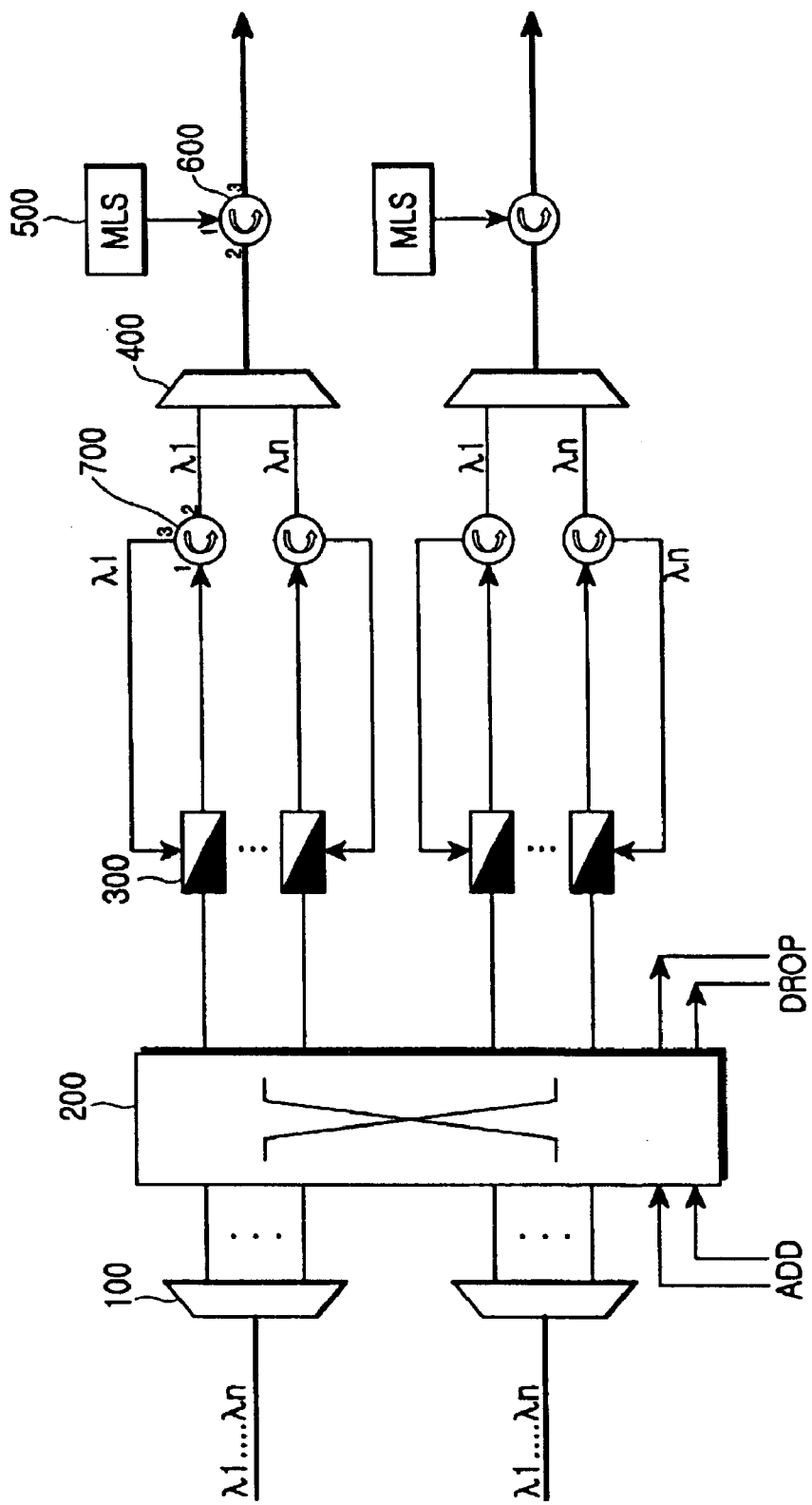

FIG. 2 is a view illustrating a block diagram of a wavelength interchanging cross-connector in accordance with a preferred embodiment of the present invention.

As shown, the inventive wavelength interchanging cross-connector comprises two input terminals and two output terminals and includes two 1×N wavelength-division-demultiplexers 100, an optical space switch 200, 2N number of wavelength converters 300, two N×1 wavelength division multiplexers 400, two multi-wavelength light sources 500, two first optical circulators 600, and 2N number of second optical circulators 700.

In operation, the 1×N wavelength-division-demultiplexer 100 demultiplexes incoming optical signals containing different wavelengths into respective e 1~N wavelengths and outputs the separated signal channels to the optical space switch 200. In the embodiment, a waveguide grating may be adapted as the wavelength division demultiplexer 100.

The optical space switch 200 is configured to switche each connection state of the signal channels received from the wavelength-division-demultiplexer 100 to the corresponding 2N number of wavelength converters 300.

The 2N number of wavelength converters 300 receives a tuned wavelength that is needed for a wavelength conversion from an external source and converts each wavelength of signal channels received from the optical space switch 200 into a corresponding wavelength of the N×1 wavelength division multiplexer 400. In this case, the 2N number of wavelength converters 300 receives a tuned wavelength of a wavelength converter from the multi-wavelength light source 500 to perform such a wavelength conversion toward a corresponding wavelength of the N×1 wavelength division multiplexer 400, and its detailed description will be described with reference to the optical cross-connector later.

The N×1 wavelength-division-multiplexer 400 multiplexes the transmission signal channels received from the wavelength converters 300, and at the same time, it divides the multi-wavelength optical signal received from the multi-wavelength light source 500 in wavelength units.

The multi-wavelength light source 500 generates a multi-wavelength optical signal.

The first optical circulator 600 includes the first to third ports 1~3; outputs the multi-wavelength optical signal received from the first port 1 to the N×1 wavelength division multiplexer 400 connected to the second port 2; and outputs the wavelength-division-multiplexed transmission optical signal received from the N×1 wavelength division multiplexer 400 via the first port 1 to an output terminal connected to the third port 3.

Similarly, the second optical circulator 700 includes the first to third ports 1~3, outputs the wavelength-converted transmission signal channel received from the first port 1 to the N×1 wavelength division multiplexer 400 connected to the second port 2; and outputs the multi-wavelength optical signal demultiplexed by the N×1 wavelength division multiplexer 400 to the wavelength converter 300 connected to the third port 3.

Now, the operations of the optical cross-connector will be described hereinafter.

As shown in FIG. 2, an optical signal where 1~N wavelengths are division-multiplexed is divided into signal channels corresponding to individual wavelengths by the 1×N wavelength division demultiplexer 100, then routed along with an added channel ADD to the corresponding node in a direction indicated by the optical space switch 200. At this time, the routed signal channels must be converted into each allocation wavelength of the N×1 wavelength division multiplexer 400 before they reach the N×1 wavelength division multiplexer 400. For this purpose, the routed signal channels are applied to the 2N number of wavelength converters 300. The 2N number of wavelength converters 300 receives a tuned wavelength needed for a wavelength conversion from the external source, then it proceeds to convert each wavelength of the signal channels. In this case, the 2N number of wavelength converters 300 respectively receives the necessary tuned wavelength from the multi-wavelength light source 500 in accordance with a preferred embodiment of the present invention.

The multi-wavelength optical signal containing no information is generated from the multi-wavelength light source 500. The generated signal is applied to the N×1 wavelength division multiplexer 400 connected to the second port 2 via the first port 1 of the optical circulator 700; then demultiplexed into individual wavelengths and applied to the wavelength converter 300 connected to the third port 3 via the second port 2 of the optical circulator 700. The applied wavelength is used as a tuned wavelength for wavelength conversion of the routed signal channels.

The signal channels routed at the optical space switch 200 are wavelength-converted and applied to the N×1 wavelength division multiplexer 400 connected to the second port 2 via the first port 1 of the optical circulator 700, then multiplexed by the N×1 wavelength division multiplexer 400. The multiplexed signals are forwarded to an output link connected to the port 3 via the second port 2 of the three-terminal optical circulator 600.

Accordingly, using the above procedures, information of a desired channel is converted into that of a desired wavelength so that an optical switching operation can be performed.

As apparent from the above description, a wavelength converter and an optical cross-connect system using the same according to the present invention does not require additional wavelength converters for each wavelength of a multiplexer as the inventive system enables one multi-wavelength light source to provide each wavelength converter with the necessary tuned wavelength. As a result, the complexity of the optical stabilizer circuit is reduced, which in turn reduces the cost of production according to the teachings of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wavelength converter using a multi-wavelength light source, comprising:

at least one multi-wavelength light source for generating a multi-wavelength optical signal;

at least one wavelength-division-multiplexer for multiplexing optical signals having a plurality of wavelengths in a forward direction and for demultiplexing the multi-wavelength optical signal in a reverse direction;

at least one wavelength converter for performing a wavelength conversion using the multi-wavelength optical signal generated by the multi-wavelength light source;

a first optical circulator for transmitting the multi-wavelength optical signal to the wavelength-division-multiplexer; and, a second optical circulator coupled between the wavelength converter and the wavelength-division-multiplexer for providing the multi-wavelength optical signal demultiplexed by the wavelength-division-multiplexer as a tuned wavelength needed to perform the wavelength conversion by the wavelength converter.

2. The wavelength converter of claim 1, wherein the first circulator is further operative to transmit the output signals from the wavelength-division-multiplexer to an output link for a subsequent transmission.

3. The wavelength converter of claim 1, wherein the second circulator is further operative to output a wavelength-converted transmission signal generated by the wavelength converter to the wavelength-division-multiplexer.

4. A wavelength interchanging cross-connector, comprising:

at least one wavelength-division-demultiplexer for dividing incoming optical signals into a plurality of different wavelengths;

at least one multi-wavelength light source for generating a multi-wavelength optical signal;

at least one wavelength-division-multiplexer for multiplexing optical signals having a plurality of wavelengths in a forward direction and for de multiplexing the multi-wavelength optical signal in a reverse direction;

a switch for switching output signals from the wavelength-division-multiplexer according to predetermined criteria for a subsequent transmission via the wavelength-division-multiplexer;

at least one wavelength converter for performing a wavelength conversion on the output signals from the switch using the multi-wavelength optical signal generated by the multi-wavelength light source;

a first optical circulator for transmitting the multi-wavelength optical signal to the wavelength-division-multiplexer; and, a second optical circulator coupled between the wavelength converter and the wavelength-division-multiplexer for providing the multi-wavelength optical signal demultiplexed by the wavelength-division-multiplexer as a tuned wavelength needed to perform the wavelength conversion by the wavelength converter.

5. The cross-connector of claim 4, wherein the wavelength-division-demultiplexer comprises a waveguide grating.

6. The cross-connector of claim 4, wherein the first circulator is further operative to transmit the output signals from the wavelength-division-multiplexer to an output link for a subsequent transmission.

7. The cross-connector of claim 4, wherein the second circulator is further operative to output a wavelength-converted transmission signal generated by the wavelength converter to the wavelength-division-multiplexer.

* * * * *